United States Patent [19]

Ott et al.

[11] Patent Number: 4,566,963

[45] Date of Patent: Jan. 28, 1986

[54] WATER-DISPERSIBLE BINDERS BASED ON MODIFIED EPOXIDE/AMINE ADDUCTS, AND THEIR PREPARATION AND USE

[75] Inventors: Günther Ott, Münster-Wolbeck; Arnold Dobbelstein; Michael Geist, both of Münster; Georg Schön, Everswinkel; Klaas Ahlers, Münster, all of Fed. Rep. of Germany

[73] Assignee: BASF Farben + Fasern AG, Hamburg, Fed. Rep. of Germany

[21] Appl. No.: 705,311

[22] Filed: Feb. 25, 1985

[30] Foreign Application Priority Data

Mar. 14, 1984 [DE] Fed. Rep. of Germany ....... 3409189

[51] Int. Cl.⁴ ...................... C08G 59/14; C25D 13/00
[52] U.S. Cl. ................................. 204/181.7; 525/510; 525/514; 523/415; 523/416; 528/100
[58] Field of Search ................ 528/100; 525/510, 514; 523/415, 416; 204/181 C

[56] References Cited

U.S. PATENT DOCUMENTS

| | | | |
|---|---|---|---|
| 2,907,741 | 10/1959 | Greenlee | 528/100 X |
| 4,031,051 | 6/1977 | Dowbenko et al. | 523/416 X |
| 4,076,676 | 2/1978 | Sommerfeld | 523/416 |
| 4,148,772 | 4/1979 | Marchetti et al. | 523/415 |

*Primary Examiner*—Earl Nielsen
*Attorney, Agent, or Firm*—Kenyon & Kenyon

[57] ABSTRACT

This application discloses water-dispersible binders which are based on modified epoxide/amine adducts and are the reaction products of A. polyepoxides having an epoxide equivalent greater than 1 and a mean molecular weight $\overline{M}_n$ of 140 to 5,000 with B. diphenylolalkanoate esters and C. amines.

29 Claims, No Drawings

WATER-DISPERSIBLE BINDERS BASED ON MODIFIED EPOXIDE/AMINE ADDUCTS, AND THEIR PREPARATION AND USE

The invention relates to water-dispersible binders based on modified epoxide/amine adducts. The invention relates in particular to cationizable resin-type reaction products which are based on side chain-modified epoxide resins, and to their preparation and use as coating agents, in particular for cathodic electrocoating.

The use of resins, which can be deposited cathodically, in electrocoating is state of the art. Due to the markedly improved anti-corrosive properties of the cataphoretic coatings on iron substrates, anodic electrocoatings have largely been displaced from fields with a range of more stringent requirements, such as in the priming of automobile bodies.

The materials, which can be deposited cathodically, contain as a rule nitrogen-basic binders which crosslink on addition of an external crosslinking agent or are self-crosslinking or curable with condensation. These nitrogen-basic carrier resins are in many cases the reaction products of epoxide resins with amines. The general advantage of the improved anti-corrosive properties of such nitrogen-basic resins is, however, frequently compensated by problems of a different nature. The aqueous dispersions frequently tend to show precipitation phenomena, to a particular extent in the presence of an added crosslinking agent. Unsatisfactory flow behavior of the resins leads to rough surfaces of the coatings. Furthermore, due to their brittleness, such coatings are at high risk in the case of deformation of the substrate, for example when hit by stones, and they have a tendency to chipping.

These drawbacks are largely avoided with a class of resins, which can be deposited cathodically, derived from chain-lengthened oxide resins. Thus, German Patent No. 2,701,002 has disclosed polyepoxides, the chain of which has been lengthened by means of organic polyols, such as polyester diols or polyether diols. These chain-lengthened epoxide resins are rendered water-dispersible by reaction with a secondary amine and can be deposited cathodically.

One problem, however, which arises in chain-lengthening with such polymeric polyols, is the occurrence of competing reactions. Under the conditions of chain-lengthening, which as a rule is carried out in the presence of an amine catalyst, epoxy-epoxy reactions and reactions of epoxy groups with secondary hydroxyl groups compete with the desired reaction between the polymeric hydroxyl group and the epoxide group. The competing reactions can consume such a proportion of the epoxide groups that an excess of amine is present in the reaction product, so that the dispersion properties of the resin formed and its throwing power and film-forming properties are impaired. Moreover, unless they are adequately controlled, these competing reactions can cause production difficulties, for example an unduly high resulting viscosity of the resin, probably owing to branching of the polymer.

Unless the viscosity is carefully monitored, gelling of the mixture can occur very rapidly. Such events can cause problems, in particular in industrial production.

It has now been found that the abovementioned drawbacks of these binders, which can be deposited cathodically, can be avoided by reacting amines with side chain-modified epoxide resins. This side chain modification can be accomplished by reacting polyepoxides, in a process known per se, with diphenol compounds which, however, contain additional side chains. The diphenol compounds carrying side chains are obtainable by esterifying diphenylolalkanoic acids with substrates containing hydroxyl groups. The build-up reaction of the binders according to the invention proceeds with a high selectivity, the competing side reactions being minimized. This gives resins which can be prepared in a controlled manner, especially also on an industrial scale, and which, surprisingly, can be deposited in cathodic electrocoating with improved voltage stability, the coatings having excellent flexibility.

It was the object of the invention to indicate novel water-dispersible binders which can be prepared with improved reproducibility and which, furthermore, avoid the abovementioned drawbacks.

The invention therefore relates to water-dispersible binders for coating agents, and in particular for cathodic electrocoating, based on modified epoxide/amine adducts, these coating agents being reaction products of (A) polyepoxides having an epoxide equivalent greater than one and a mean molecular weight $M_n$ of 140 to 5,000 with (B) diphenylolalkanate esters and (C) amines.

In the invention, a build-up of side chain-modified epoxide resins takes place by reaction of polyepoxides (component A) with diphenylolalkanate esters (component B), the ratio of the epoxide groups and the phenylol groups of component B being selected such that a sufficient residual content of epoxide groups for the reaction with the amines (component C) remains, so that adequate water-dispersibility is ensured. The building-up process leading to these side chain-modified epoxide resins proceeds by a type of reaction which is known in principle in industry and which, for example, is also sometimes used in the preparation of commercial epoxide resins of the bisphenol A or bisphenol F types. In this case, a reaction between the epoxide groups and the phenolic OH groups takes place, which, with appropriate catalysis, is largely free from side reactions, with formation of a larger molecule.

The order in which the components A, B and C are reacted is not an essential point of the invention. Typically, the component A is first reacted with component B in the presence of a catalyst, such as a phosphonium salt, for example ethyltriphenylphosphonium acetate or ethyltriphenylphosphonium iodide, or a metal compound, for example tin(II) acetate, whereupon the reaction with the amine (component C) follows. Alternatively, the polyepoxide can first be reacted with an amine or a mixture of amines, followed by the reaction with component B. In this case, the amines act simultaneously as the catalysts for the reaction of component B with the epoxy groups of the polyepoxide. The reaction product can then be rendered water-dispersible by treatment with an acid.

In the present invention, any low-molecular compounds as well as higher-molecular polymers can be used as the polyepoxides, provided that they contain more than one epoxide group per molecule on average. Epoxide compounds having two or more epoxide groups in the molecule are preferred.

The preferred polyepoxides are polyglycidyl ethers of cyclic polyols. Polyglycidyl ethers of polyphenols, such as bisphenol A or bisphenol F, are particularly preferred. These polyepoxides can be prepared by etherifying a polyphenol with an epihalogenohydrin or a dihalogenohydrin, such as epichlorohydrin or dichlorohydrin, in the presence of alkali. Examples of polyphenols are 2,2-bis-(4-hydroxyphenyl)-propane, 1,1-bis-(4-hydroxyphenyl)ethane, 2-methyl-1,1-bis-(4-hydroxyphenyl)-propane, 2,2-bis-(4-hydroxy-3-tertiary-butylphenyl)-propane, bis-(2-hydroxynaphthyl)-methane and 1,5-dihydroxy-3-. . . naphthalene.

Apart from polyphenols, other cyclic polyols can also be used for the preparation of the polyglycidyl ethers of cyclic polyol derivatives. Examples of other cyclic polyols are all cyclic polyols, in particular cycloaliphatic polyols, such as 1,2-cyclohexanediol, 1,4-cyclohexanediol, 1,2-bis-(hydroxymethyl)-cyclohexane, 1,3-bis-(hydroxymethyl)-cyclohexane and hydrogenated bisphenol A.

Oxyalkylated adducts, such as ethylene and propylene oxide adducts of these alicyclic polyols and polyphenols, can also be used as the cyclic polyol component.

Examples of other polyepoxides are the polyglycidyl ethers of polyhydric alcohols, such as ethylene glycol, diethylene glycol, triethylene glycol, 1,2-propylene glycol, 1,3-propylene glycol, 1,4-butylene glycol and 1,5-pentanediol.

Polyglycidyl esters of polycarboxylic acids, obtained by reacting epichlorohydrin or a similar epoxy compound with an aliphatic or aromatic polycarboxylic acid, can also be used. Examples of suitable polycarboxylic acids are dicarboxylic acids, such as adipic acid, succinic acid, glutaric acid, terephthalic acid and dimerized linoleic acid.

Polyglycidyl ethers of phenolic novolak resins or similar polyphenol resins represent another class of suitable polyepoxides.

Polyepoxides obtained by epoxidation of an olefinically unsaturated alicyclic compound can also be used in the invention. Such polyepoxides include diepoxides or higher epoxides and also mixtures of epoxides, some of which contain one or more mono-epoxides. These polyepoxides are non-phenolic and are obtained by epoxidation of alicyclic olefins, for example with oxygen and selected metal catalysts, with perbenzoic acid, acetaldehyde monoperacetate or with peracetic acid. Examples of such polyepoxides are 1,5-diepoxycyclooctane and isomers of dicyclopentadiene dioxide.

The polyepoxides (component A) are to be understood as also including those epoxide resins which are produced only during the reaction in situ. Epoxide resins of this type are obtained by adding quantities of a chain-lengthening agent B to a low-molecular epoxide resin A, the A/B equivalent ratio being greater than one, and allowing complete reaction, with increase in the molecular weight, to give a resin C which again has terminal epoxide groups. Specific examples of these are epoxide resins from the bisphenol A series or bisphenol F series, which result from such reactions with the said bisphenols and are widely used as commercial products.

The diphenolalkanate ester (component B)/polyepoxide (component A) equivalent ratio should be smaller than one, preferably 0.1 to 0.9 and with particular preference 0.4 to 0.8. The reaction is controlled such that the phenolic OH groups of component B are substantially fully converted and an excess of epoxy groups for the addition of the amines remains.

Component B can be an esterification product of a diphenylolalkanoic acid with a monohydric alcohol, polyanhydric alcohol or a prepolymer containing hydroxyl groups. Diphenylolalkanoic acids are compounds of the formula

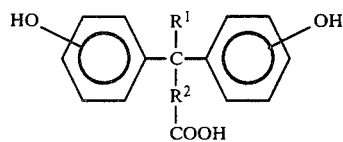

where $R^1$ is hydrogen or an alkyl radical, $R^2$ is an alkylene bridge $C_nH_{2n}$ with $n=0$ to 8, and the hydroxyl groups are in general in the ortho-position and/or, preferably, in the para-position of the phenyl radicals.

Examples of preferred diphenylolalkanoic acids are 4,4-bis-(4-hydroxyphenyl)-acetic acid, also called diphenylolacetic acid hereinafter, and 4,4'-bis-(4-hydroxyphenyl)valeric acid, also called diphenylolvaleric acid hereinafter.

The alcoholic esterification component B can be any aliphatic or cycloaliphatic or aromatic alcohol. Some examples are: methanol, ethanol, propanol, butanol, pentanol, hexanol, heptanol, octanol, nonanol, decanol and their branched isomers. Longer-chain and/or branched alcohols, for example 2-ethylhexanol, isodecanol, 2,2-dimethylpropan-1-ol or cyclohexanol, are preferred.

Unsaturated alcohols, for example allyl alcohol or oleyl alcohol, can also be used in the present invention.

Diols are in principle also suitable as the alcoholic ester component. In the esterification with diphenylolalkanoic acids, however, diols can give a difunctional reaction and thus form diphenylolalkanoates which contain up to four phenylol groups in the molecule. However, since an unduly high phenylol functionality in the reaction with the abovementioned polyepoxides undesirably increases the end viscosity of the resin according to the invention, special precautions must be taken in this case during the preparation of component B. Thus, an excess of the diol can be employed in the esterification of the diphenylolalkanoic acid and, after completion of the reaction, the excess quantity of diol can, if desired, be distilled off again from the reaction mixture under reduced pressure. Examples of diols which can be used for this purpose are ethylene glycol, propane-1,2-diol, propane-1,3-diol, butane-1,4-diol and neopentyl glycol.

On the other hand, it is also possible to react equivalent quantities of a diol, in which case diphenylolalkanoates are obtained which, on average, contain four epoxide-reactive phenylol groups per molecule. In this case, it is advantageous to react a part of the phenolic OH groups subsequently with mono-epoxides, in order to reduce the functionality of component B in this way and to prevent gelling of the reaction mixture during the subsequent reaction with the polyepoxides (component A). In such cases, non-volatile diols of higher molecular weight can also be employed in addition to the diols mentioned above. Very suitable examples are hexane-1,6-diol, cyclohexanedimethanol, decane-1,10-diol, 2-ethyl-2-n-butylpropane-1,3-diol and neopentyl glycol hydroxypivalate.

Examples of diols suitable for such purposes also include polymeric diols, such as polyalkylene etherdiols or polyester-diols, such as are described in German Offenlegungsschrift No. 3,108,073 in another connection. Preferred polymeric diols are the poly-(oxytetramethylene) glycols having molecular weights in the range from 500 to 3,000 and the polycaprolactone diols which are obtained by ring-opening polymerization of ε-caprolactone with diols and have molecular weights in the range from 500 to 3,000.

Particularly suitable alcohol components for the preparation of the components B are prepolymers which, on average, contain only one hydroxyl group per molecule, such as polyether-alcohols or polyester-alcohols. Such monohydric polyether-alcohols are obtained in a simple manner by oxyalkylating an alcohol, such as methanol, ethanol or other alkanols, with an alkylene oxide. Suitable alkylene oxides are ethylene oxide, 1,2-propylene oxide and 1,2-butylene oxide. Further suitable monohydric alcohols are the products which are obtainable commercially as "glycol ethers" and are monoalkyl ethers of other polyalkylene glycols. Especially suitable polyester-alcohols result, for example, from the esterification of monoalcohols and diols with dicarboxylic acids in a molar ratio of 1 to n+1, with n=0 to 15.

There is a wide range of variation in the starting materials for the preparation of polyester-alcohols suitable for this purpose. In addition to the abovementioned examples for monoalcohols and diols, the dicarboxylic acid components employed can be organic dicarboxylic acids or their anhydrides, for example terephthalic acid, phthalic anhydride, tetrahydrophthalic anhydride, maleic anhydride, adipic acid, azelaic acid and dimerized fatty acids.

A very particularly suitable class of polyester-alcohols comprises the polylactone-alcohols which result from the ring-opening polymerization of lactones with monoalcohols. Polycaprolactone-alcohols derived correspondingly from ε-caprolactone are particularly preferred. The polycaprolactone-alcohols are prepared by reacting 1 mole of a monoalcohol with n moles of ε-caprolactone in the presence of a catalyst, such as dibutyl-tin dilaurate, at elevated temperatures, a polycaprolactone-alcohol being formed which carries a terminal hydroxyl group. The molecular weight of the polyester-alcohols employed according to the invention is within the range from 200 to 3,000, preferably within the range from 300 to 1,000.

For preparing component B, one of the substrates containing hydroxyl groups, as described above, is then reacted with the diphenylolalkanoic acid, the esterification proceeding with elimination of water. The reaction is carried out as a rule at 100° C. to 200° C., advantageously at 140° C. to 180° C. The reaction can be carried out in the absence or presence of a suitable solvent. Advantageously, however, the water of esterification can be removed from the system by the addition of an entrainer, for example toluene or xylene. To accelerate the reaction, it is appropriate to add esterification catalysts, for example p-toluenesulfonic acid, acidic ion exchange resins or metal salts. The reaction is continued until the acid number of the reaction mixture is less than 5, and preferably less than 1, mg of KOH per g of product.

If equivalent amounts of a diol are used as the substrate containing hydroxyl groups, the esterification product obtained analogously to the process described above is additionally reacted, before or during the reaction with component B, with such quantities of a monoepoxide that the mean phenylene functionality of the resulting component B is 1 to 3, and preferably 2, per molecule. The reaction of the mono-epoxide with the phenylol groups is advantageously carried out in the presence of catalysts, for example the phosphonium salts or metal salts mentioned above. Examples of suitable monoepoxides are ethylene oxide, propylene oxide, butylene oxide, n-butyl glycidyl ether, allyl glycidyl ether, phenyl glycidyl ether, 2-ethylhexyl glycidyl ether or Versatic acid glycidyl esters.

The amines used as component C for the reaction with the epoxide compound can be primary, secondary or tertiary, secondary amines being particularly suitable. Primary and secondary amines can be added directly to the epoxide ring, and tertiary amines can be added, for example, via a further functional group in the molecule. Preferably, the amine should be a water-soluble compound. Examples of such amines are mono- and di-alkylamines, such as methylamine, ethylamine, propylamine, butylamine, dimethylamine, diethylamine, dipropylamine, methylbutylamine and the like. Alkanolamines, for example methylethanolamine, diethanolamine and the like, are likewise suitable. The use of alkanolamines is preferred.

In most cases, low-molecular amines are used, but it is also possible to employ higher-molecular monoamines, in particular if it is intended to increase the flexibility of the resin by the incorporation of such amines. Similarly, mixtures of low-molecular and higher-molecular amines can also be used for modifying the properties of the resin.

Moreover, polyamines such as dialkylaminoalkylamines, for example dimethylaminoethylamine, diethylaminoethylamine, diethylaminopropylamine and the like, can be used. In a special embodiment, such amines can, before the reaction with the polyepoxide, first be reacted with equimolar amounts of a monoepoxide, the result being amines with a secondary and a tertiary amino group and an additional hydroxyl group. Specific examples of such diamines containing hydroxyl groups are N,N-dimethyl-N'-2-hydroxyethyl-propylenediamine, N,N-dimethyl-N'-2-hydroxyethyl-neopentyldiamine and 2-hydroxyethylpiperazine.

The reaction of the amine with the compound containing epoxy groups frequently starts even during the mixing of these materials. In some cases, however, heating to moderately elevated temperatures may be desirable, for example to 50° to 150° C., but reactions are also possible at lower and higher temperatures. Frequently, it is advantageous to raise the temperature at least slightly for a sufficient period towards the end of the reaction, in order to ensure complete conversion.

For the reaction with the epoxy-containing compound, at least such a quantity of amine should be used that the resin assumes a cationic character, ie. that it migrates to the cathode under the action of a voltage in the coating bath, provided that it has been rendered soluble by addition of an acid. Virtually all the epoxy groups of the resin can be reacted with an amine. It is also possible, however, to leave excess epoxy groups in the resin, and these hydrolyze on contact with water, hydroxyl groups being formed.

The preferred amines are monoamines, or polyamines containing a secondary amino group. Mixtures of different amines are likewise preferred. Polyamines such as ethylenediamine, diethylenetriamine, triethylenetetraamine, N-(2-aminoethyl)-ethanolamine and piperazine can, however, also be used successfully, even though it is not preferred to use them in large quantities, since they are multifunctional and show a greater tendency than monoamines towards the formation of a gelled reaction mixture.

If polyamines or primary amines are used, special precautions should be taken to avoid gelling. For example, an excess of amine can be used and the excess can be stripped off under reduced pressure after the end of the reaction. Alternatively, the polyepoxide can be added to the amine in order to ensure that an excess of amine is present.

Examples of suitable hydroxyl-containing amines are alkanolamines, dialkanolamines, trialkanolamines, alkylalkanolamines, arylalkanolamines and arylalkylalkanolamines, which as a rule contain 2 to 18 carbon atoms in the alkanol, alkyl and aryl chains. Specific examples are ethanolamine, N-methylethanolamine, diethanolamine, N-phenylethanolamine, N,N-dimethylethanolamine, N-methyldiethanolamine and triethanolamine.

Amines such as hydrazine and propyleneimine can also be used. In the sense of this invention, ammonia is also an amine which can be used.

A further possibility for obtaining the requisite dispersibility in water is the use of Mannich bases as component C, ie. reaction products of suitable phenols, carrying groups suitable for a reaction with an epoxide ring, with formaldehyde and secondary amine. In this way, the binder becomes self-crosslinkable at the same time. 2,4,6-Tri-(dimethylaminomethyl)-phenol may be mentioned as a specific example.

The reaction product of the amines with the polyepoxide is provided with its cationic character by at least partial neutralization with an acid. Examples of suitable acid, are organic and inorganic acids, such as formic acid, acetic acid, lactic acid, phosphoric acid and carbonic acid. The degree of neutralization depends on the particular product. In general, it is only necessary to add such a quantity of acid that the products can be dispersed in water. Typically, a quantity of acid is sufficient such that at least 30% of the total theoretical degree of neutralization is reached. It is also possible to use so much acid that the theoretical degree of neutralization of 100% is exceeded.

In order to obtain highly resistant coatings when the binders according to the invention are used, it is advantageous to add to the electrocoating a crosslinking agent which effects crosslinking of the binder at elevated temperatures, or to modify the binder in such a way that it contains reactive groups which effect self-crosslinking at elevated temperatures. A self-crosslinking system can advantageously be obtained by reacting the binder with a partially blocked polyisocyanate which has one free isocyanate group per molecule on average and the blocked isocyanate groups of which are stable at room temperature and are unblocked at elevated temperatures and react with the hydroxyl groups formed by the opening of the epoxide rings, a urethane being formed. The binder can be self-crosslinkable owing to the use of the abovementioned Mannich bases as component D.

Frequently applied methods for the crosslinking of binders have been published, for example, in German Offenlegungsschriften Nos. 2,057,799 and 2,752,256, and in European patent application Nos. 12,463 and 4,090.

If crosslinking agents are used, they amount as a rule to about 5 to about 60% by weight of the binder.

About 20 to about 40% by weight of binder are preferred.

Examples of suitable aminoplast crosslinking agents are the triethyltrimethyl ether of hexamethylolmelamine, the hexabutyl ether of hexamethylolmelamine and the hexamethyl ether of hexamethylolmelamine, and polymeric butylated melamine/formaldehyde resins.

Urea/aldehyde crosslinking agents can be prepared in a conventional manner by reacting urea and an aldehyde up to the resol stage and alkylating the reaction product with an alcohol under acidic conditions, an alkylated urea/aldehyde resin being obtained. An example of a suitable crosslinking agent based on a urea/aldehyde resin is a butylated urea/formaldehyde resin.

Blocked polyisocyanates can also be used as the crosslinking agents. Any polyisocyanates can be used in the invention, in which the isocyanate groups have been reacted with a compound in such a way that the blocked polyisocyanate formed is resistant to hydroxyl groups at room temperature but reacts at elevated temperatures, as a rule in the range from about 90° to about 300° C. Any desired organic polyisocyanates suitable for crosslinking can be used for the preparation of the blocked polyisocyanates.

The organic polyisocyanates to be used as crosslinking agents in the invention can also be prepolymers which are derived, for example, from a polyol including a polyether-polyol or a polyester-polyol. C Any suitable aliphatic, cycloaliphatic or aromatic monohydric alcohols can be used for blocking the polyisocyanates. Further suitable blocking agents are the hydroxyamines.

A further suitable class of crosslinking agents is based on polyfunctional activated esters, for example β-hydroxyalkyl esters. Crosslinking agents of this type are essentially non-acidic saturated and/or unsaturated polyesters which are obtained by reacting polycarboxylic acids or acidic polyesters with mono-epoxide compounds. Such crosslinking agents have been described in European patent application No. 12,463.

The invention also relates to a process for preparing water-dispersible binders for electrocoatings which can be deposited cathodically and are based on modified epoxide/amine adducts, which process comprises reacting (A) polyepoxides having an epoxide equivalent greater than one, (B) diphenylolalkanoate esters and (C) amines.

The invention also relates to the use of the binders for electrocoating baths.

In order to provide the synthetic resin with a sufficiently cationic character for the electrodeposition, the neutralizable nitrogen per gram of total resin solids is in general maintained preferably between 0.3 and 3 milliequivalents.

Aqueous dispersions of the synthetic resin products according to the invention are very suitable as coating compositions, in particular for the production of coatings by electrodeposition. The coating compositions can, however, also be applied to the substrates in the conventional manner. For dispersing in water, the resinous products are neutralized, in order to form cationic groups, for examples salts of tertiary amines and, in the case of hydrolyzed ketimine-containing resins, salts of primary amines.

The neutralization of the products is effected by reacting some or all the amino groups with a water-soluble acid, for example formic acid, acetic acid or phosphoric acid. The degree of neutralization depends on the particular resin and it suffices in general to add only such a quantity of acid that the resin will be dispersible in water.

The concentration of the resinous products in the aqueous medium depends on the process parameters to be applied and, as a rule, is not critical. Usually, water represents the main proportion of the aqueous dispersion which can contain, for example, about 5 to about 50% by weight of resin solids.

In addition to water, the aqueous medium can also contain a coalescing solvent. The additional use of a coalescing solvent leads in some cases to a particular appearance of the film. Such solvents include hydrocarbons, alcohols, esters, ethers and ketones. The preferred coalescing solvents are monohydric alcohols, glycols and polyols as well as ketones and ether-alcohols. Specific coalescing solvents are isopropanol, butanol, isophorone, 4-methoxymethylpentan-2-ol, ethylene and propylene glycol, the monoethyl, monobutyl and monohexyl ethers of ethylene glycol, and 2-ethylhexanol. The quantity of the coalescing solvent is not critical and, in general, about 0.1 to 40% by weight, preferably about 0.5 to 25% by weight, based on the total weight of the aqeuous medium, is used.

In most cases, the aqueous dispersion also contains pigments and other conventional additives, such as surface-active agents. The conventional pigments can be used, such as iron oxides, lead oxides, strontium chromate, carbon black, coal dust, titanium dioxide, talc, barium sulfate and colored pigments such as cadmium yellow, cadmium red, chromium yellow and the like. The pigment content of the dispersion is as a rule expressed as a pigment/resin ratio. In the invention, the pigment/resin ratio is as a rule within the range from 0.01 to 5:1. Other conventional additives can be present in the dispersion as a rule in quantities of about 0.01 to 3% by weight, based on the total weight of the resin solids.

In the electrodeposition of the synthetic resins according to the invention, the latter are brought into contact, in an aqueous dispersion, with an electrically conductive anode and an electrically conductive cathode, the cathode being the surface which is to be coated. During the contact with the aqueous dispersion, an adhering film of the coating composition is deposited on the cathode when a voltage is applied between electrodes.

The conditions under which the electrodeposition takes place are in general similar to those used for electrodeposition of other coating compositions. Usually, the voltage is about 50 to 500 volt.

Advantagtously, the dispersion should have a pH from 3 to about 9 during the electrodeposition.

The synthetic resins according to the invention can be electrodeposited on any desired conductive substrates, in particular metals such as steel, aluminum, copper or magnesium. After the electrodeposition, the coating can be cured by heating to elevated temperatures, as a rule from 90° to 200° C., for periods of 1 to 30 minutes.

In order to ensure rapid and complete curing, it is sometimes advantageous for a catalyst to be present in the coating composition. The quantity of the catalyst used should be sufficient for accelerating curing of the deposited film. Typical quantities are about 0.05 per cent based on the weight of the total resin solids. As a rule, about 2% by weight of such a catalyst are used. If, however, the curing temperatures are sufficiently high, the catalyst can be omitted.

The invention also relates to a process for electrophoretically coating an electrically conductive substrate, connected as the cathode, from an aqueous bath based on cationic binders at least partially neutralized with acids, the binders having been rendered self-crosslinking by a reaction or the bath containing an additional crosslinking agent, wherein the binders are reaction products of (A) polyepoxides having an epoxide equivalent greater than one, (B) diphenylolalkanoate esters and (C) amines.

The invention is explained in more detail in the examples which follow. Both in the examples and in the description, all parts and percentages data are by weight, unless otherwise stated.

I. PREPARATION OF THE DIPHENYLOLALKANOATE ESTERS

Component B1:

In a reactor provided with a water separator, 1,860 parts of 4,4-bis-(hydroxyphenyl)-valeric acid are heated to 180° C. together with 1,185 parts of 2-ethylhexanol and 80 parts of xylene, the esterification proceeding with elimination of water. After 100 parts of water have been removed from the system, the temperature is raised to 200° C. After 115 parts of water in total have formed, the volatile fractions are distilled off under reduced pressure. The mixture is then diluted with xylene to a solids content of 90%. The product has a residual acid number of 1 mg of KOH/g.

Component B2:

674 parts of hydroxypivaloyl-neopentyl glycol and 1,840 parts of 4,4-bis-(hydroxyphenyl)-valeric acid are reacted analogously in the presence of 120 parts of xylene and 1 part of p-toluenesulfonic acid. After 110 parts of water have been eliminated, the residual water and the solvent are distilled off under reduced pressure. The solid resin is then adjusted with equal parts of xylene and isopropanol to give a solids content of 80%. The product has an acid number of 5 mg of KOH/g and has four phenylol groups in the molecule.

Component B3:

In a suitable reaction vessel, 500 parts of 2-ethylhexanol are reacted with 1,345 parts of ε-caprolactone at 160° C. in the presence of 7 parts of dibutyl-tin dilaurate. After a reaction of 2 hours, 1,085 parts of 4,4-bis-(hydroxyphenyl)-valeric acid and 70 parts of xylene are introduced, whereupon the esterification starts. The water of esterification is removed from the system via a water separator. In the course of 2 hours, the temperature is raised to 190° C. and maintained at this level until the theoretical quantity of water (68 parts) has almost been reached. Small quantities of volatile fractions are then distilled off, and the mixture is allowed to cool and diluted with 300 parts of xylene to a solids content of 90%. The product has a phenylol functionality of 2 and a phenylol equivalent weight of 375.

II. PREPARATION OF THE WATER-DISPERSIBLE BINDERS ACCORDING TO THE INVENTION

Example 1

The traces of water contained in a mixture of 1,098 parts of a commercially available epoxy resin, based on bisphenol A and having an epoxide equivalent weight of 188, and 650 parts of component B1 are removed from the system under reduced pressure in the presence of 25 parts of xylene. After the addition of 166 parts of bisphenol A and 2 parts of ethyltriphenylphosphonium acetate, the reaction mixture is heated to 160° C. A check of the epoxide equivalent weight gives the value of 1,300 after 1 hour. After cooling to 90° C., 106 parts of diethanolamine and 66 parts of a reaction product obtained from equimolar amounts of diethylaminoethylamine and butylene oxide are added, whereupon the reaction temperature rises to 110° C. This temperature is maintained for a further 90 minutes and the mixture is then diluted with 310 parts of methyl isobutyl ketone and 100 parts of hexylglycol. A clear resin having a solids content of 85% is obtained.

Example 2

A reactor provided with suitable accessories is charged with 1,984 parts of a solid epoxide resin, based on bisphenol A and having an epoxide equivalent weight of 496, and 320 parts of xylene. The mixture is heated to 100° C. and the traces of water contained therein are removed from the system under reduced pressure. After the addition of 810 parts of component B3 and 2 parts of ethyltriphenylphosphonium iodide, the reaction mixture is reacted in the course of 2 hours at 135° C. The epoxide equivalent weight of 1,300, then determined, shows virtually complete incorporation of component B3. An extension of the reaction time by 1 further hour leads to an epoxide equivalent weight of 1,310. This extension of the reaction time by 50% shows that the reaction has subsided, and is an indication of reliable production of the binders according to the invention, since competing side reactions have evidently been minimized. The mixture is then allowed to cool to 100° C., and 157 parts of diethanolamine and 65 parts of N-(2-hydroxyethyl)-piperazine are added. After a short exothermic peak, the reaction is continued for 90 minutes at 100° C. After dilution with 150 parts of hexylglycol, a clear resin having a viscosity of 430 mPas (40% in propylene glycol methyl ether) and a solids content of 85% is obtained.

Example 3

935 parts of component B2 are reacted with 375 parts of Versatic acid glycidyl ester (epoxide equivalent weight 250) at 140° C. with the addition of 1 part of tin-II octoate. After 2 hours, epoxide is no longer detectable. 1,984 parts of an epoxide resin, based on bisphenol A and having an epoxide equivalent weight of 496, and 188 parts of a liquid epoxide resin, based on bisphenol A and having an epoxide equivalent weight of 188, are introduced one after the other into the reaction mixture. The temperature is raised again to 140° C., while volatile fractions and traces of water from the epoxide resin are distilled off continuously. 175 parts of xylene and 7 parts of tin-II octoate are added and the mixture is refluxed. After 3 hours, an epoxide equivalent weight of 1,320 is reached. The reaction mixture is cooled, 157 parts of diethanolamine and 75 parts of N-methylethanolamine are added, and the temperature is maintained for 90 minutes at 105° C. Subsequently, the mixture is diluted with 440 parts of methyl isobutyl ketone, 200 parts of isobutanol and 210 parts of butylglycol. The product has an amine number of 40 mg of KOH/g and a solids content of 78%.

III. USE OF THE BINDERS ACCORDING TO THE INVENTION IN HEAT-CURABLE COATING AGENTS AND PREPARATION OF AQUEOUS BINDER DISPERSIONS.

In addition to the use in cathodic electrocoatings, the binders according to the invention can also be used in the conventional manner as coating agents, for example by casting, dipping, spraying or roller-application. In order to obtain highly resistant coatings, it is advantageous to cure the binders via a chemical reaction by admixing a crosslinking agent. Examples of crosslinking agents, with which the binders according to the invention form mixtures stable at room temperature and crosslink on heating, are listed below.

Crosslinking Agent 1

According to German Offenlegungsschrift No. 2,701,002, Example 1, a blocked isocyanate crosslinking agent (polyurethane crosslinking agent) is prepared by adding 218 parts of 2-ethylhexanol slowly to 291 parts of an 80/20 isomer mixture of 2,4-/2,6-toluylene diisocyanate with stirring and under a nitrogen atmosphere, the reaction temperature being kept below 38° C. by external cooling. The batch is maintained for a further half an hour at 38° C. and is then heated to 60° C., whereupon 75 parts of trimethylolpropane and then 0.08 part of dibutyl-tin dilaurate as a catalyst are added. After an exothermic reaction at the start, the batch is maintained for 1.5 hours at 121° C., until substantially all the isocyanate groups have been consumed, which is detectable in the infrared spectrum. The batch is then diluted with 249 parts of ethylene glycol monoethyl ether.

Crosslinking Agent 2

A polyester crosslinking agent is prepared according to European Patent No. 0,040,867, Example 2d): 192 parts of trimellitic anhydride and 500 parts of Versatic acid glycidyl ester having an epoxide equivalent weight of 250 are mixed and heated to 100° C., with stirring. An exothermic reaction takes place, and the temperature rises to 190° C. After cooling to 140° C., 2 parts of benzyldimethylamine are added. The mixture is maintained at 140° C. 3 hours. This gives a viscous, clear product, which is additionally diluted with 295 parts of ethylene glycol monobutyl ether.

Crosslinking Agent 3

A crosslinking agent which carries $\beta$-alkoxyalkyl ester groups active for crosslinking is prepared as follows:

In a reaction vessel which can be heated by a heat transfer oil and is fitted with a water separator, reflux condenser and an interposed Raschig column, 1,000 g of succinic anhydride (10 mol) are added to 1,462 g of hexylglycol (10 mol), with stirring and under an inert gas supply. The reaction mixture is heated to 120° C., the temperature being briefly raised to 130° C. by the exothermic heat of reaction. The temperature is maintained, until the acid number is 230 mg of KOH/g.

400 g of xylene, 5 g of N-cetyl-N,N,N-trimethylammonium bromide and 940 g of a bisphenol A epoxide resin having an epoxide equivalent weight of 188 (2.5 mol) are then added. Within 1 hour, the temperature is raised again to 130° C. and maintained there until the epoxide number has fallen to zero. After the addition of 2 g of p-toluenesulfonic acid solution (25% in n- propanol), the temperature is raised to 200° C. in the course of 4 hours, while the water of reaction formed is continuously removed from the system. The temperature is raised further to 220° C. and maintained there until approximately 90 g of water have been separated off and the acid number has fallen to less than 2 mg of KOH/g of solid resin. The mixture is then cooled and discharged without dilution.

Solids content: 95.2% by weight (measured after heating to 130° C. for 1 hour)
Acid number: 1.1 mg of KOH/g of solid resin
Viscosity: 480 mPas (measured at 25° C. after dilution with methyl isobutyl ketone to 70% by weight)

Example 4

The Example illustrates the use of the binders according to the invention as organically dissolved systems for conventional application methods. From the components given below, a clear surface-coating solution of 50% solids content is prepared, and the clear surface-coating is knife-coated in a wet film thickness of 50 micrometers to zinc-phosphated steel sheet and then baked for 20 minutes at 160° C.

| | |
|---|---|
| Resin from Example 2 | 41.2 parts |
| Crosslinking agent 3 | 15.8 parts |
| Lead-II octoate solution+ | 1.5 parts |
| Propylene glycol methyl ether | 41.5 parts |
| | 100.0 parts |

+ commercially available catalyst solution of 24% lead content

This gives a smooth-textured clear coating film which does not show any traces of attack after rubbing 50 times to and fro with a cotton wool pad soaked in methyl isobutyl ketone. The reverse impact test giving 160 (in×lb) shows excellent flexibility.

Example 5

This Example describes the preparation of an aqueous binder dispersion.

922 parts of the resin from Example 1, 480 parts of crosslinking agent solution 1, 8 parts of dibutyl-tin dilaurate, 2 parts of antifoam solution and 13.2 parts of glacial acetic acid are mixed, and 611 parts of deionized water are added. The viscous dispersion is homogenized for 20 minutes, before it is diluted with a further 1,965 parts of deionized water, a little at a time. This gives a low-viscosity aqueous dispersion which, after subsequent filtration, has the following characteristic data:

| | |
|---|---|
| Solids content (60 minutes, 130° C.) | 28.8% |
| Milliequivalents of base | 0.62 |
| Milliequivalents of acid | 0.20 |

Example 6

This Example describes the preparation of an aqueous binder dispersion. The procedure is substantially the same as in Example 5. Dibutyl-tin dilaurate is replaced by lead-II octoate.

| | |
|---|---|
| Resin from Example 2 | 922 parts |
| Crosslinking agent 3 | 353 parts |
| Lead-II octoate solution | 28 parts |
| Antifoam solution | 2 parts |
| Glacial acetic acid | 13.5 parts |
| Deionized water | 922 parts |
| Deionized water | 1,160 parts |

After the dispersion has been prepared, it is subjected to brief vacuum distillation at 60° C., during which 75 parts of organic phase are separated off from the distillate. After filtration, the dispersion has the following characteristic data:

| | |
|---|---|
| Solids content (60 minutes, 130° C.) | 35.8% |
| Milliequivalents of base | 0.58 |
| Milliequivalents of acid | 0.20 |

Example 7

This Example describes a further aqueous binder dispersion, which is prepared analogously to the preceding Examples.

| | |
|---|---|
| Resin from Example 3 | 1,033 parts |
| Crosslinking agent 2 | 447 parts |
| Lead-II octoate solution | 28 parts |
| Antifoam solution | 2 parts |
| 10% aqueous acetic acid solution | 155 parts |
| Deionized water | 1,133 parts |
| Deionized water | 1,680 parts |

The filtered dispersion has the following characteristic data:

| | |
|---|---|
| Solids content (30 minutes, 150° C.) | 25.2% |
| Milliequivalents of base | 0.51 |
| Milliequivalents of acid | 0.23 |

IV. PREPARATION OF THE ELECTROCOATING BATHS AND DEPOSITION OF COATING FILMS

For a test as cathodic electrocoatings, the aqueous binder dispersions described above are adjusted with deionized water to a solids content of 25%. 165 parts of the pigment paste described below are introduced into 1,000 parts of the particular binder dispersion, with stirring. The solids content in the bath is then reduced to 20% (30 minutes, 150° C.) with deionized water.

Pigment Paste

A paste binder is prepared according to Example 1(a) of German Offenlegungsschrift No. 3,121,765. For this purpose, 200 parts of ethylene glycol monobutyl ether are heated to 90° C. in a reaction vessel. Within 2 hours, a mixture of 396 parts of N-vinylpyrrolidone, 204 parts of vinyl propionate and 1.2 parts of azobisisobutyronitrile are then added dropwise. Finally, the polymerization is completed at 90° C. for 1 hour. The resulting solution polymer has a Fikentscher K value of 24. The solids content of the copolymer solution is 76%.

In an agitator mill, 250 parts of the above copolymer solution, 210 parts of ethylene glycol monobutyl ether, 555 parts of ethylene glycol monoethyl ether, 837 parts of water, 1,084 parts of kaolin, 217 parts of basic lead silicate, 145 parts of carbon black, 36 parts of rutile and 3,000 parts of glass beads of 2 mm diameter are stirred for 45 minutes at a speed of 1,000 revolutions/minute.

After the glass beads have been separated off, a black paste having a solids content of 50.6% is obtained.

The electrocoating baths are allowed to age for 3 days at 30° C., with stirring. The coating films are deposited within 2 minutes on cathodically connected zincphosphated steel test panels at the indicated voltage. The bath temperature is here 27° C. The deposited wet films are rinsed with deionized water and baked for 20 minutes at 180° C. or 160° C.

| Coating according to | | Example 5 | Example 6 | Example 7 |
|---|---|---|---|---|
| Deposition voltage | V | 350 | 400 | 300 |
| Film thickness | μm | 16 | 21 | 18 |
| FORD throwing power | cm (V) | 21 (400) | 23 (400) | 20 (320) |
| Flow+ | | 1 | 1 | 1.5 |
| Crosscut+ | | 0 | 0 | 0 |
| Erichsen cupping test | mm | 6.5 | 10.0 | 5.6 |
| Reverse impact test | (in × lb) | 110 | 180 | 90 |
| Crosslinking++ | | 0 | 0 | 0 |
| Baking temperature | °C. | 180 | 160 | 160 |

+0 equals best rating, 5 equals poorest rating
++20 double wipes with a cottonwool pad soaked in MIBK
0 = no attack on the surface

What is claimed is:

1. A water-dispersible binder based on modified epoxide/amine adducts, which comprises the reaction product of:
    A. a polyepoxide having an epoxide equivalent greater than 1 and a mean molecular weight $\overline{M}_n$ of 140 to 5,000 with
    B. a diphenylolalkanoate ester and
    C. an amine.

2. The binder according to claim 1, wherein said polyepoxide is a polyglycidyl ester or ether.

3. The binder according to claim 1, wherein said polyepoxide is an epoxide resin based on bisphenol A.

4. The binder according to claim 1, wherein said diphenylolalkanoate is the esterification product of a diphenylolalkanoic acid and an hydroxyl containing compound.

5. The binder according to claim 4, wherein said polyepoxide is selected from the group consisting of a polyglycidyl ester, a polyglycidyl ether and an epoxide resin based on bisphenol A.

6. The binder according to claim 5, wherein the diphenylolalkanoic acid is bis-(hydroxyphenyl)-acetic acid.

7. The binder according to claim 5, wherein the diphenylolalkanoic acid is 4,4'-bis-(hydroxyphenyl)-valeric acid.

8. The binder according to claim 4 or claim 5, wherein said compound containing hydroxyl groups is a saturated or unsaturated alcohol.

9. The binder according to claim 8, wherein the alcohol is a branched alcohol having more than 4 carbon atoms.

10. The binder according to claim 4 or claim 5, wherein the compound containing hydroxyl groups is a diol.

11. The binder according to claim 4 or claim 5 wherein the compound containing hydroxyl groups is a polyesteralcohol which on average is monofunctional.

12. The binder according to claim 1, 4 or 5, wherein up to 75% of the phenylol groups of said diphenylolalkanoate ester are etherified with mono-epoxides.

13. The binder according to claim 1, 4 or 5, wherein said amine is a primary and/or secondary and/or tertiary amine or a mixture of the said amines.

14. The binder as claimed in claim 13, wherein said amine is an alkanolamine.

15. The binder as claimed in claim 13, wherein said amine is a polyamine.

16. The binder as claimed in claim 15, wherein the polyamine contains at least one secondary and one or more tertiary amino groups.

17. The binder according to claim 1, 4 or 5, which is in combination with a curing agent.

18. The process for preparing water-dispersible binders based on modified epoxide/amine adducts, which comprises reacting
    A. a polyepoxide having an epoxide equivalent greater than 1 and a mean molecular weight $\overline{M}_n$ of 140 to 5,000 with
    B. a diphenylolalkanoate ester and
    C. an amine.

19. The process according to claim 18 further comprising the step of rendering the product of the process of claim 18 water-dispersible by protonating said product with an acid.

20. The process according to claim 18 further comprising the step of preparing an aqueous dispersion of the binder product of the process of claim 18 wherein said binder is rendered water-dispersible by protonation with acid.

21. The process according to claim 18 or claim 20, wherein said polyepoxide is selected from the group consisting of a polyglycidyl ether or ester, and an epoxide resin based on bisphenol A, and said diphenylolalkanoic acid is the esterification product of an alkanoic acid and an hydroxylated compound.

22. The process according to claim 21, wherein said diphenylolalkanoic acid is 4,4'-bis-(hydroxyphenyl)valeric acid or bis-(hydroxyphenyl)-acetic acid.

23. The process according to claim 21, wherein said amine is selected from the group consisting of primary, secondary or tertiary amines or mixtures thereof.

24. The process according to claim 21, wherein said amine is selected from the group consisting of alkanolamines and polyamines.

25. A heat curable surface coating composition comprised of the binder of claim 1, 4 or 5.

26. The heat curable surface coating composition of claim 25 further comprising a crosslinking agent.

27. The heat curable surface coating composition according to claim 25 further including a pigment and flow agent.

28. A process comprising electrophoretically coating an electrically conductive substrate connected as the cathode, from an aqueous bath containing a cationic binder which has been at least partially neutralized with acids, and wherein said cationic binder comprises the reaction product of:
    A. a polyepoxide having an epoxide equivalent weight greater than 1 and a mean molecular weight $\overline{M}_n$ of 140 to 5,000,
    B. a diphenylolalkanoate ester, and
    C. an amine.

29. The process according to claim 28, wherein said bath further includes a crosslinking agent.

* * * * *